United States Patent [19]

Schiavone et al.

[11] 3,980,191

[45] Sept. 14, 1976

[54] MOTOR TRUCK WITH PLURAL CONTAINER HANDLING MECHANISM

[75] Inventors: Michael Schiavone, North Haven; Harold Hoette, Farmington, both of Conn.

[73] Assignee: Michael Schiavone & Sons, Inc., North Haven, Conn.

[22] Filed: Dec. 12, 1974

[21] Appl. No.: 532,049

[52] U.S. Cl. .............................. 214/518; 214/317; 214/83.36; 214/516
[51] Int. Cl.² .......................................... B60P 1/00
[58] Field of Search ............ 214/83.1, 83.14, 83.24, 214/83.36, 518, 519, 89, 77 R, 317, 516

[56] References Cited
UNITED STATES PATENTS

| | | | |
|---|---|---|---|
| 2,304,117 | 12/1942 | Norbom | 214/516 |
| 2,345,790 | 4/1944 | Brooks | 214/317 |
| 2,348,019 | 5/1944 | Norbom | 214/516 |
| 2,534,057 | 12/1950 | Pride | 214/518 |
| 2,710,105 | 6/1955 | Schwartz | 214/83.36 |
| 3,404,793 | 10/1968 | Pinkert | 214/518 |

*Primary Examiner*—Robert J. Spar
*Assistant Examiner*—Lawrence J. Oresky
*Attorney, Agent, or Firm*—DeLio and Montgomery

[57] ABSTRACT

A multiple bucket loader-unloader mechanism for handling a plurality of heavy bulk cargo buckets on an elongated truck chassis, said chassis including a frame and bed long enough to hold at least two such buckets and the mechanism including a motor driven chain bucket mover, with means for attaching the chain to at least one bucket in order to move it to and from a forward position, in which position there is room on the truck bed to place at least one additional bucket. The mechanism supplements the bucket loading, unloading and dumping means normally provided on bucket handling trucks.

3 Claims, 7 Drawing Figures

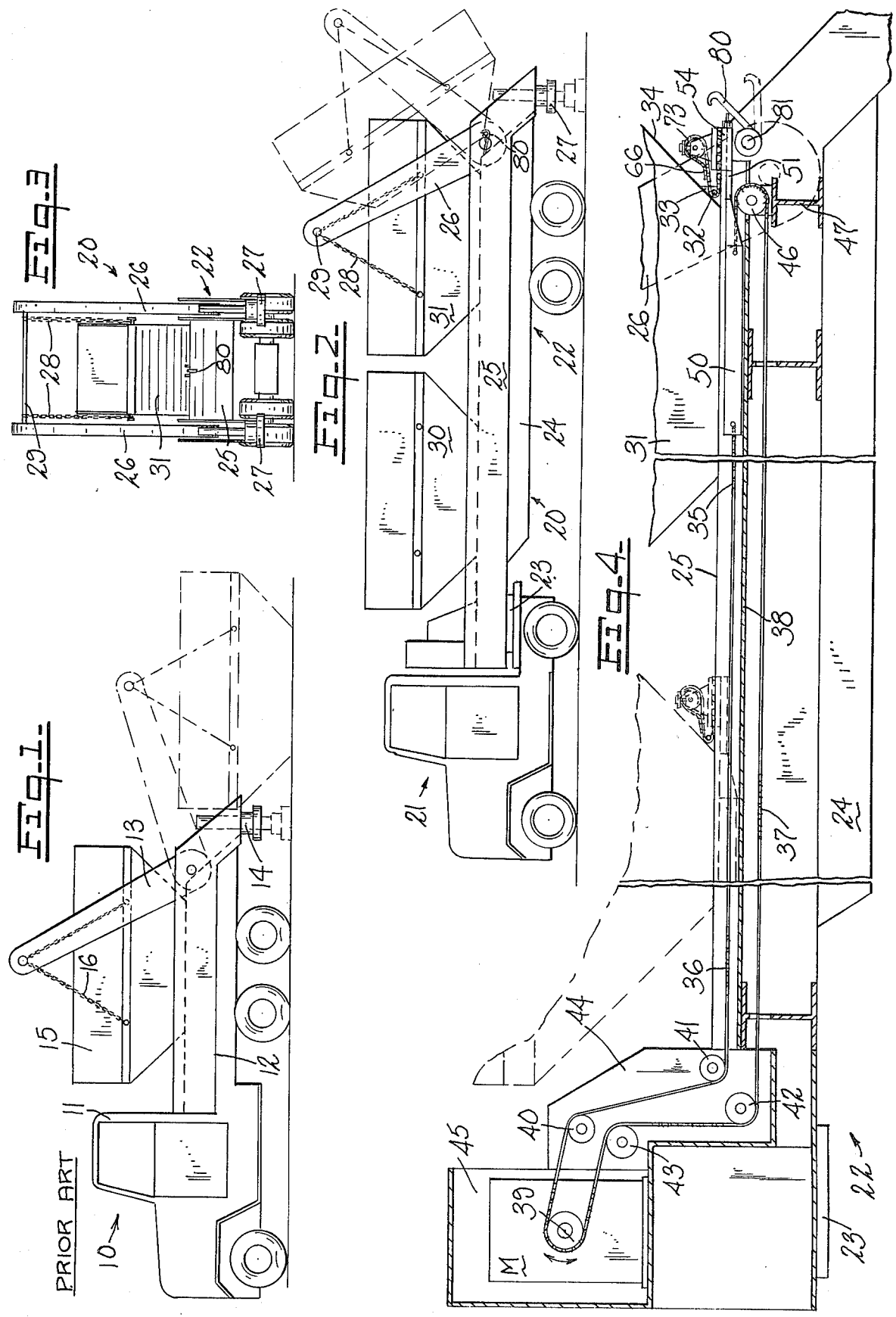

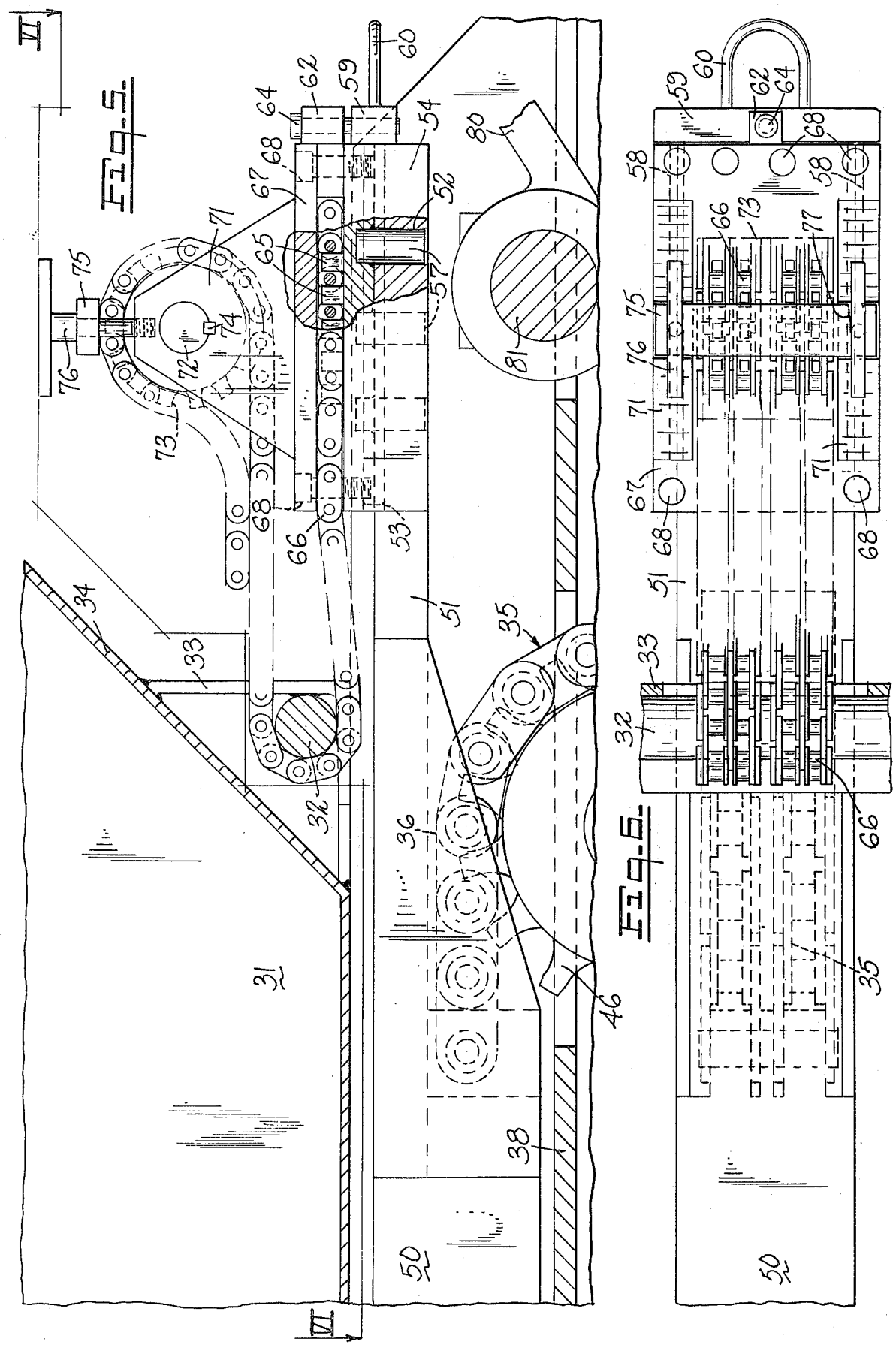

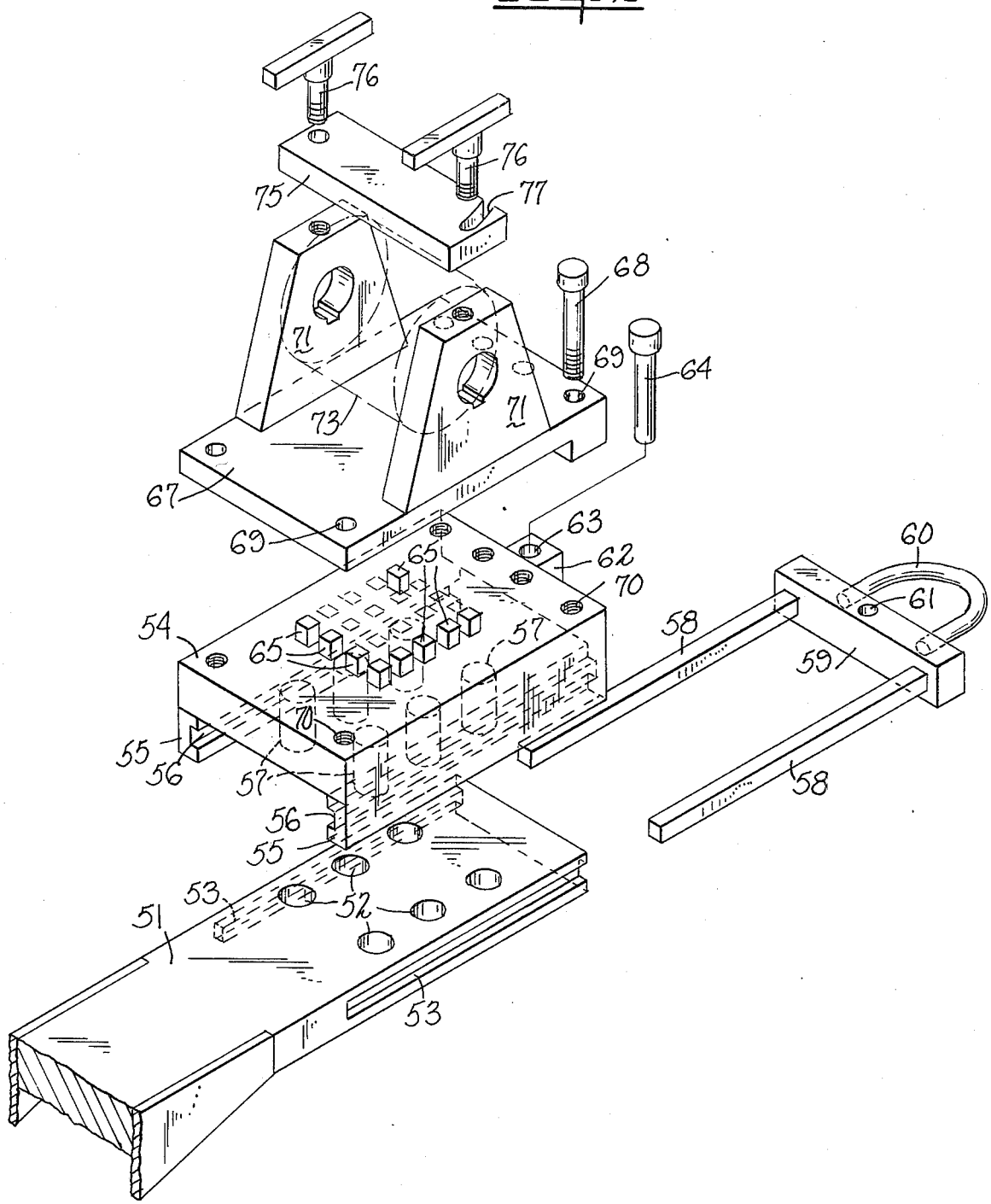

3,980,191

MOTOR TRUCK WITH PLURAL CONTAINER HANDLING MECHANISM

BACKGROUND OF THE INVENTION

This invention relates to a multiple bucket loading and unloading mechanism installed on an elongated truck chassis for handling two or more heavy bulk cargo buckets and particularly for moving at least one bucket forward and backward on the truck bed away from and into the position it assumes when initially loaded or when ready to be unloaded. The mechanism includes a motor driven chain and means for connecting a bucket to the chain so that it can be moved. The invention is shown herein as being embodied in a truck adapted to carry two buckets but extension, in principle, to the carrying of more than two buckets is contemplated.

A truck of the type used for transporting heavy bulk cargo has a flat bed, lifting arms for moving a hopper-shaped container, called a bucket, between a position on the ground behind the truck and a position resting on the truck bed, and dumping means enabling the bucket to be tipped around an axis at the rear of the truck bed to an angle sufficient to dump out the contents of the bucket. In the use of such equipment, several buckets are usually provided at the place where they are to be filled with cargo to be transported; a truck is backed up to a filled bucket; the lifting arms are hooked on to the bucket; the latter is lifted up and deposited on the truck bed; the truck takes the bucket to an unloading point; and the bucket is either unloaded full (for emptying later) or is dumped. In either case the truck must return to its loading station to pick up another single filled bucket and repeat the operation. A single bucket may be adapted, typically, to contain about five tons of heavy cargo, such as metal scrap.

It is an object of the present invention to provide a truck having a bed long enough to receive at least two cargo buckets and to equip the truck with mechanisms for moving a first bucket toward and away from the lifting arms so that a second bucket can be loaded on and unloaded from the same bed.

It is a further object to provide such a combination wherein a plurality of cargo buckets can be transported by a single truck and handled by a single set of lifting arms and dumping means.

It is another object to provide a chain drive in the truck frame and bed, with easily operable means for connecting a cargo bucket to the chain for moving the bucket forward or rearward.

It is a still further object to provide a truck of the type described with means for selectively unloading or dumping each of a plurality of buckets carried by the truck.

It is another object to provide certain improvements in the form, construction and arrangement of the several parts by which the above-named and other objects may be effectively attained. The invention accordingly comprises the features of construction, combination of elements, and arrangement of parts which will be exemplified in the construction hereinafter set forth, and the scope of the invention will be indicated in the claims.

A practical embodiment of the invention is shown in the accompanying drawings, wherein:

FIG. 1 is a somewhat diagrammatic side elevation of a truck with bucket handling means, as presently known, the bucket being shown in full lines on the truck and in broken lines on the ground;

FIG. 2 is a similar side elevation of a truck embodying the present invention, having an elongated frame and bed, loaded with two buckets, one of which is shown in broken lines in its dumping position;

FIG. 3 is a rear end view of the truck shown in FIG. 2;

FIG. 4 is a longitudinal vertical section through the truck frame and bed, parts being broken away and parts being shown in elevation;

FIG. 5 is a detail vertical section through the truck frame, bucket and bucket securing means, parts being broken away and parts being shown in section;

FIG. 6 is a sectional view on the line VI—VI of FIG. 5, showing a detail plan of the securing means; and FIG. 7 is an exploded view of the parts constituting the bucket securing means, without the chain shown in FIGS. 5 and 6.

Referring to the drawings, FIG. 1 shows a normal truck 10 having a cab 11, a bed and frame 12, lifting arms 13 and stabilizers 14 at each rear corner. The truck is adapted to carry a single cargo bucket 15 which is moved between positions on the ground and on the truck bed by means of chains 16. The arms are interconnected by an axle extending across the truck frame and are moved by hydraulic (or gear) means, which is conventional and not shown.

A truck 20, according to the invention, is shown in FIGS. 2 and 3, the truck including a tractor 21 and a semi-trailer 22 with the customary fifth wheel connection 23. The semi-trailer portion has an elongated frame 24 and bed 25, together with normal lifting arms 26, stabilizers 27 and bucket chains 28, the chains being mounted on a cross bar 29 connecting the ends of the arms, and the arms 26 being operable in the same manner as the arms 13 by conventional means, not shown.

The frame 24 and bed 25 are long enough to accommodate two buckets and the invention comprises means for sliding a first bucket 30 to and from a forward position wherein it leaves room for a second bucket 31. In the rearward position a bucket may be either lifted up and placed on the ground (as in FIG. 1) or hooked onto the rear end of the frame and dumped, as shown in broken lines in FIG. 2. For engagement with the dumping means or with the bucket moving means, each described below, the hopper-shaped buckets are provided with bars 32 fixed in brackets 33 and extending along at least the mid-portion of at least one lower edge at the bottom of the sloping end walls 34 of the buckets.

The bucket moving means includes an endless roller chain 35 having its upper run 36 in a channel extending the length of the vehicle bed 25 and its lower run 37 below the floor 38 of the channel. The forward portion of the chain passes around a reversible winch 39, idler sprockets 40, 41 and 42 and a tension sprocket 43, all mounted in suitable housings 44, 45 at the front end of the semi-trailer. The winch motor housing is indicated generally at M. The rear end of the chain passes around the return sprocket 46 carried on a shaft which is supported from a cross beam 47 at the rear of the frame.

The connector means for attaching a bucket to the chain includes a connector plate 50 interpolated into the upper run 36 of the chain near its rear end, the plate having a rearwardly extending shoe 51, adapted to project beyond the return sprocket 46 to a point adjacent the rear end of the vehicle frame. The shoe 51 is provided with a plurality of vertical holes 52 (six being shown in FIG. 7) and its sides are grooved to form rearwardly opening parallel half-square keyways 53. A chain carrying block 54 has depending flanges 55, spaced to fit freely along each side of the shoe 51, the facing surfaces of the flanges being grooved to form half-square keyways 56 which are complementary to the keyways 53 when the block 54 is fitted on the shoe 51. The block is provided also with pins 57 projecting downwardly between the flanges and being of a size and location to engage in the holes 52. The keys for locking together the shoe and the block are shown as square rods 58 mounted in a key-bar 59 to lie parallel and spaced the proper distance to slide easily into the keyways 53, 56 when the block is assembled on the shoe with pins 57 in the holes 52. The key-bar 59 has a handle 60, of any convenient form, and a vertical hole 61. At the rear of the block is a boss 62 having a vertical hole 63 with which the hole 61 is aligned when the keys are fully engaged in the keyways, and a pin 64 is adapted to be inserted in the holes 63, 61 to hold the key-bar in locking position. The upper surface of the block 54 is provided with a plurality of square lugs 65 disposed in a suitable pattern to engage in the openings of a flat roller tie chain 66, for connection to the bucket.

The chain 66 must have considerable strength while also being small enough to be passed readily around the exposed portion of the bar 32 on the end of a bucket to be moved, so that four single chains, two double chains or one quadruple chain may be used. In each case, several links at one end of the chain are engaged with the lugs 65 (FIGS. 5 and 6) leaving a free length of chain extending forward, the engaged links being firmly secured on their lugs by means of the cover plate 67 which is screwed down on top of the lugs by means of bolts 68 (only one being shown in FIG. 7) passing through the holes 69 and threaded into the holes 70 in the block. The plate 67 is provided with upstanding posts 71 bored to receive the axle 72 of a wide multiple sprocket 73, the axle being locked in the posts by keys 74 (or the like) so that the sprocket cannot rotate. For securement to the bucket, the free end of the chain is passed around the bar 32, back under the sprocket 73 and around the sprocket (top of FIG. 5), engaging as many teeth as possible. The final locking is effected by means of a locking bar 75 which can be screwed down on top of the chain and sprocket by means of thumb or T-head screws 76 threaded into the tops of the posts 71. One of the thumb screws may be engaged in a slot 77, so that the bar 75 can swing to a chain releasing position without requiring removal of the bar or thumb screws.

A manually operated dumping hook 80 is pivotally mounted on the rear of the frame by means of the axle 81, the hook being arranged to engage the bar 32 when the hook is raised (full lines in FIG. 4) otherwise to be inactive (broken lines in FIG. 4). When a bucket is lifted with its bar 32 engaged by the hook, it will be tipped to and beyond the broken line position of FIG. 2, thereby dumping the contents.

In operation, an empty truck 20 is backed up to a loaded bucket, chains 28 are hooked onto the sides of the bucket and the arms 26 are actuated to lift the bucket, swing it forward, and deposit it on the truck bed adjacent the rear end thereof, the chains being detached and readied for engagement with a second bucket. The chain 35 will have been actuated to ensure that the connector plate 50 and shoe 51 are at their rear-most position, the other parts of the connector means being removed. If the loaded bucket is to be moved forward the chain carrying block 54, with chain attached thereto, is locked onto the shoe by means of the keys 58, the chain 66 is led around the bar 32 on the bucket and its free end is locked on the sprocket 73, as described above. The operator then actuates the winch 39 to drive the chain 35 in a direction to move the connector plate forward along the channel, thus causing the block 54 and associated parts to push forward against the adjacent bracket 33 and sliding the bucket forward on the bed of the vehicle, to its desired advanced position. With one bucket thus loaded and stowed, the truck may be backed up to a second loaded bucket and the latter can be lifted and deposited in the space vacated by the first one. At one or more delivery points the operations are reversed, either or both buckets being dumped or unloaded, provided that, if the rear bucket is dumped, it must also be unloaded in order that the forward bucket may be moved to the rear for dumping and/or unloading. During rearward movement of the forward bucket the strain on the connecting chain 66 may be great, hence the need for making it strong while still small enough to be manipulated in the available space.

The inclusion of bucket lifting arms on the truck chassis produces a self-contained unit, able to pick up and deliver buckets at any desired points. The bucket moving mechanism on the truck chassis could, however, be useful also in a vehicle designed to be loaded and unloaded by separate lifting devices such as hoists or cranes.

By the provision of mechanism enabling a truck to carry two buckets at a time, instead of the customary one, the number of trips needed to move a given quantity of cargo is cut in half, while the loading time is only increased by a few minutes. It is evident that lengthening of the semi-trailer and/or redesign of the buckets could be resorted to in order that more than two buckets might be carried in each load, the bucket moving apparatus being adapted to move, one at a time, as many buckets as might be provided. The bucket moving mechanism could be installed in a non-trailer or full trailer truck, with suitable adaptation, but the semi-trailer form is considered to be preferable. Reference herein to a "truck chassis" includes the frame, bed and associated elements of any truck.

It may thus be seen that the objects of the invention set forth, as well as those made apparent from the preceding description are efficiently attained and, since certain changes may be made in the above construction without departing from the spirit and scope of the invention, it is intended that all matter contained in the above description or shown in the accompanying drawings shall be interpreted as illustrative and not in a limiting sense.

What we claim is:

1. A motor truck chassis with loader-unloader mechanism comprising a truck bed and frame adapted to support a plurality of cargo carrying containers, means for moving one container at a time between a first position on said truck bed and a position to the rear of the truck chassis, a channel extending longitudinally of said bed, an endless drive chain having at least one run disposed in said channel, a connector plate fixed to said chain, a reversible motor for driving the chain and means for releasably connecting the chain to a container, the releasable connecting means comprising a block adapted to be removably locked to the connector plate, a tie chain having one end fixed to said block and being adapted to be engaged with a container, and means for fastening the other end of said tie chain to said block.

2. A motor truck chassis according to claim 1 wherein the connector plate and the rearward projecting means are located below the surface level of the truck bed, the block projects above the surface level of the bed and the tie chain fastening means is above the block.

3. A motor truck chassis according to claim 1 wherein the means for fastening the other end of the tie chain includes a sprocket non-rotatably fixed on the block.

* * * * *